UNITED STATES PATENT OFFICE.

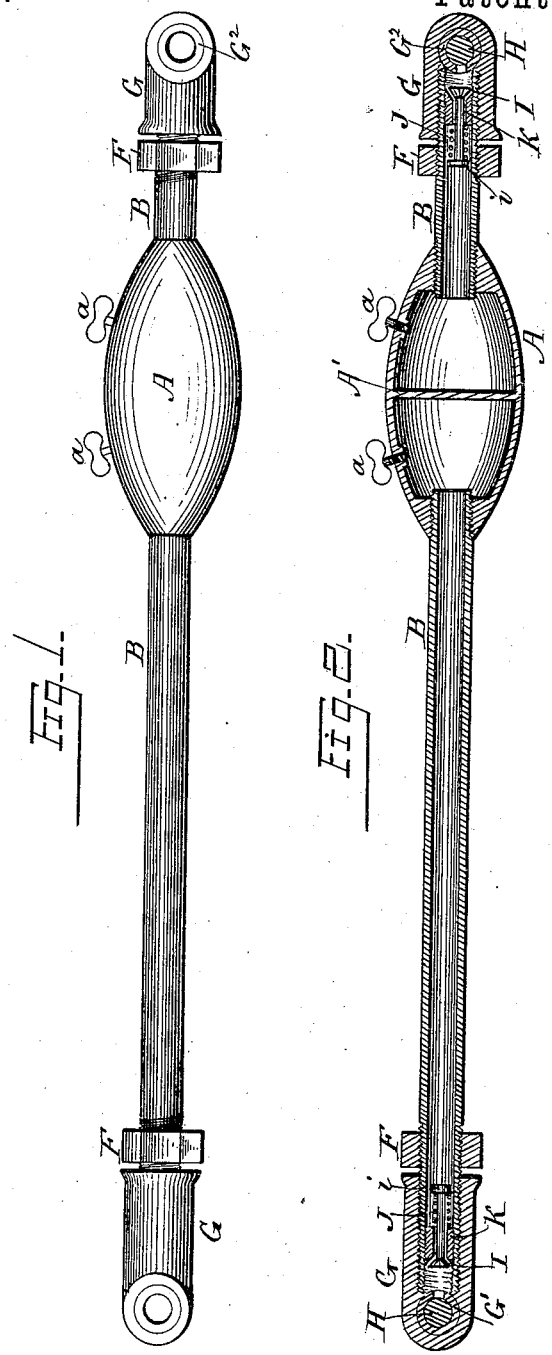

PHILIPP CHARLES CLOSE, OF AUGUSTA, GEORGIA.

PITMAN.

SPECIFICATION forming part of Letters Patent No. 337,380, dated March 9, 1886.

Application filed August 3, 1885. Serial No. 173,443. (No model.)

*To all whom it may concern:*

Be it known that I, PHILIPP CHARLES CLOSE, a citizen of the United States, residing at Augusta, in the county of Richmond and State of Georgia, have invented certain new and useful Improvements in Pitmen, of which the following is a specification, reference being had therein to the accompanying drawings.

My invention relates to pitmen suitable for harvesters, saw-mills, and other machinery in which oil is made to automatically reach the journal-bearings from a reservoir distant from said bearings; and the object of my invention is to produce an inexpensive, efficient, and durable self-oiling pitman-rod provided with adjustable spring-valves to regulate the flow of oil.

The invention will first be described in connection with the drawings, and then be pointed out in the claims.

In the drawings, Figure 1 is a side view of the pitman. Fig. 2 is a longitudinal section of the same.

The oil-reservoir is represented at A. Its form is preferably elliptical or egg-shaped, and is divided in two chambers by a transverse partition, A', to render the oiling of one end of the pitman independent of the other. Each chamber is provided with an oil-hole closed by a thumb-screw, $a$, or by any other suitable stopper. Into each end of the oil-reservoir is screwed an iron or steel tube, B, of suitable length to form together the pitman-rod. The outer end of each tube B has its periphery screw-threaded to engage with the screw-thread cut in the interior of the sleeve G, having a closed end or head, G', forming or inclosing the bearing $G^2$ for the wrist-pins H, projecting from the fly-wheel, and form the cutter-bar of a mowing-machine. The bearing $G^2$ has a hole in the side adjoining the tube B, to permit oil from the latter to reach the journal H. To prevent the tubes E unscrewing from the sleeves G, a jam-nut, F, is placed upon the thread of each tube to bear against the end of its sleeve. The flow of oil from each oil-chamber is controlled by a valve, I, having the under side of its head preferably conical, and resting upon a conical seat formed in the small sleeve K. This sleeve has its periphery screw-threaded, and is screwed into the outer end of each tube B. Upon the end of the valve-stem opposite the conical valve there is placed either a nut, $i$, to render the length of stem adjustable, or a flat collar to receive the thrust of one end of the coiled spring J, the opposite end of which abuts against the end of the sleeve K, and thus the pressure of the valve upon its seat is regulated either by the size and temper of the spring-wire in the spring J or by the tension brought upon it by the nut $i$.

When a machine carrying this pitman is standing still, there is no flow of oil to the bearings, and thus no waste; but when the pitman is in motion the momentum will throw first one valve then the other a short distance off its seat and allow a small quantity of the oil to flow between the loosely-fitting or grooved valve-stem and the sleeve K. By this construction the pitman-rod can carry enough oil in its chambers to thoroughly lubricate its journals during a week's work or longer, and thus their heating and wear is prevented.

Having now fully described my invention, I claim—

1. The combination of the oil-reservoir A, the tubular pitman-rods at each end thereof, valve-seats secured therein, and spring-valves, substantially as and for the purpose described.

2. The combination of the oil-reservoir A, its transverse partition, tubular pitman-rods, valve-seats therein, and spring-valves, with the sleeves G and jam-nut upon ends of the pitman, substantially as and for the purpose described.

In testimony whereof I affix my signature in presence of two witnesses.

PHILIPP CHARLES CLOSE.

Witnesses:
CHARLES W. DOUGHTY,
FRANK R. COOKE.